United States Patent
Kim (10) Patent No.: US 10,095,087 B2
(45) Date of Patent: Oct. 9, 2018

(54) UNMANNED AERIAL VEHICLE SYSTEM FOR TAKING CLOSE-UP PICTURE OF FACILITY AND PHOTOGRAPHY METHOD USING THE SAME

(71) Applicant: KOREA INSTITUTE OF CIVIL ENGINEERING AND BUILDING TECHNOLOGY, Gyeonggi-do (KR)

(72) Inventor: Hyeong Yeol Kim, Gyeonggi-do (KR)

(73) Assignee: KOREA INSTITUTE OF CIVIL ENGINEERING AND BUILDING TECHNOLOGY, Gyeonggi-Do (KR)

( * ) Notice: Subject to any disclaimer, the term of this patent is extended or adjusted under 35 U.S.C. 154(b) by 28 days.

(21) Appl. No.: 15/378,057

(22) Filed: Dec. 14, 2016

(65) Prior Publication Data

US 2018/0149947 A1    May 31, 2018

(30) Foreign Application Priority Data

Nov. 28, 2016   (KR) .................. 10-2016-0158983

(51) Int. Cl.
| | |
|---|---|
| *G03B 39/00* | (2006.01) |
| *G03B 15/00* | (2006.01) |
| *B64C 25/10* | (2006.01) |
| *B64C 39/02* | (2006.01) |
| *B64D 47/08* | (2006.01) |
| *G05D 1/00* | (2006.01) |

(52) U.S. Cl.
CPC ............ *G03B 15/006* (2013.01); *B64C 25/10* (2013.01); *B64C 39/024* (2013.01); *B64D 47/08* (2013.01); *G05D 1/0038* (2013.01); *B64C 2201/108* (2013.01); *B64C 2201/127* (2013.01); *B64C 2201/146* (2013.01)

(58) Field of Classification Search
CPC ...................................................... G03B 39/00
USPC .......................................................... 396/12
See application file for complete search history.

(56) References Cited

U.S. PATENT DOCUMENTS

| | | | |
|---|---|---|---|
| 2013/0216089 A1 | 8/2013 | Chen et al. | |
| 2016/0076892 A1* | 3/2016 | Zhou ..................... | B64C 39/024 701/3 |
| 2017/0029134 A1* | 2/2017 | Lee ....................... | G05D 1/0676 |
| 2017/0197714 A1* | 7/2017 | Golden ................ | B64C 39/024 |
| 2017/0371353 A1* | 12/2017 | Millinger, III ......... | G05D 1/101 |

* cited by examiner

*Primary Examiner* — Clayton E Laballe
*Assistant Examiner* — Fang-Chi Chang
(74) *Attorney, Agent, or Firm* — JCIPRNET (57) ABSTRACT

Provided are an unmanned aerial vehicle system for taking a close-up picture of a facility and a photography method using the same. The unmanned aerial vehicle system can safely bring a drone, which is an unmanned aerial vehicle, close to a facility surface, which is a subject, using supports and settling members to precisely photograph damage, deterioration, and defects on the facility surface and can safely bring the unmanned aerial vehicle close to the facility and fix the unmanned aerial vehicle on the facility in a perpendicular direction with respect to the subject surface of the facility to improve the quality of an image captured by a camera when the unmanned aerial vehicle is remotely controlled or autonomously navigates.

18 Claims, 11 Drawing Sheets

UNMANNED AERIAL VEHICLE SYSTEM FOR TAKING CLOSE-UP PICTURE OF FACILITY AND PHOTOGRAPHY METHOD USING THE SAME

CROSS-REFERENCE TO RELATED APPLICATION

This application claims priority to and the benefit of Korean Patent Application No. 10-2016-0158983, filed on Nov. 28, 2016, the disclosure of which is incorporated herein by reference in its entirety.

BACKGROUND

1. Field of the Invention

The present invention relates to an unmanned aerial vehicle, and more particularly, to an unmanned aerial vehicle system for taking a close-up picture of a facility which can take close-up pictures of damage, deterioration, defects, etc. of a facility or a structure by bringing a drone, which is an unmanned aerial vehicle, close to the facility or the structure and a photography method using the unmanned aerial vehicle system.

2. Discussion of Related Art

In infrastructures and facilities built in a process of developing into an industrial society, structural damage is caused by defects in the design and construction processes or various factors which were not taken into consideration during the design process. As the period of use of these structures elapses, the structures get old, and their safety is severely threatened. For example, in many cases of structures having severe structural damage, the limited periods of use which were set in their design processes are drastically reduced.

Accordingly, efforts for ensuring long-term safety and operability of infrastructures are urgently necessary. In particular, large structures, such as a building, a bridge, a dam, etc., are continuously exposed to a variety of operational loads, impacts of external objects, earthquakes, wind loads, wave loads, corrosion, etc., and thus ensuring the safety of a structure from them is a matter of great economic and social concern. Accurate safety diagnosis of large structures requires a diagnosis technology based on monitoring of behavior of a structure through suitable experimental measurement, a technology for mechanically analyzing structural damage, and an analytical technology for modeling structural damage.

As technologies for detecting damage of a large structure, materially non-destructive testing, positive displacement measurement, vibrational characteristic measurement, etc. are used. For example, a method of estimating damage of a structure using positive displacement measurement and vibrational characteristics is generally referred to as system identification (SID). According to such SID, behavior of a structural system is measured and modeled in a structural analytical manner to estimate a structure characteristic value.

As mentioned above, non-destructive testing for abnormal structural behavior evaluation is cutting-edge technology that is very frequently used in overall industries including machinery, flight, shipbuilding, construction, and so on. In particular, in the case of a large infrastructure facility such as a long-span bridge or a skyscraper, abnormal behavior causes damage, and the damage results in enormous economic damage and heavy casualties. Consequently, a flawless behavior evaluation is necessary.

Accordingly, a safety check is periodically performed on major infrastructure facilities, but is mainly at only a level of visual inspection of a point accessible by an inspector. Also, inspection periods are limited in practice due to insufficient manpower and resources for a check, difficulty in checking inaccessible facilities, and so on.

Meanwhile, the number of decrepit bridges is drastically increasing, resulting in an increase in demands for a check and also an increase in the number of check times. A considerable part of such checks is performed with the naked eye.

To replace such an inspector's visual inspection, research and development for using a drone which is an unmanned aerial vehicle and an image processing technique is actively underway, but it is impossible to find a fine crack of a structure or identify whether or not there is internal damage in a structure. Hence, there is a necessity for, for example, a technique for bringing a drone close to a target structure to capture a precise image and interpreting the image to diagnose a problem of the structure at an early stage.

For example, a drone, which is an unmanned aerial vehicle, is used to check a facility, such as photography of an appearance of the facility, etc., but close-up photography is necessary to capture precise images of damage, deterioration, and defects of a structure.

Figure 1:
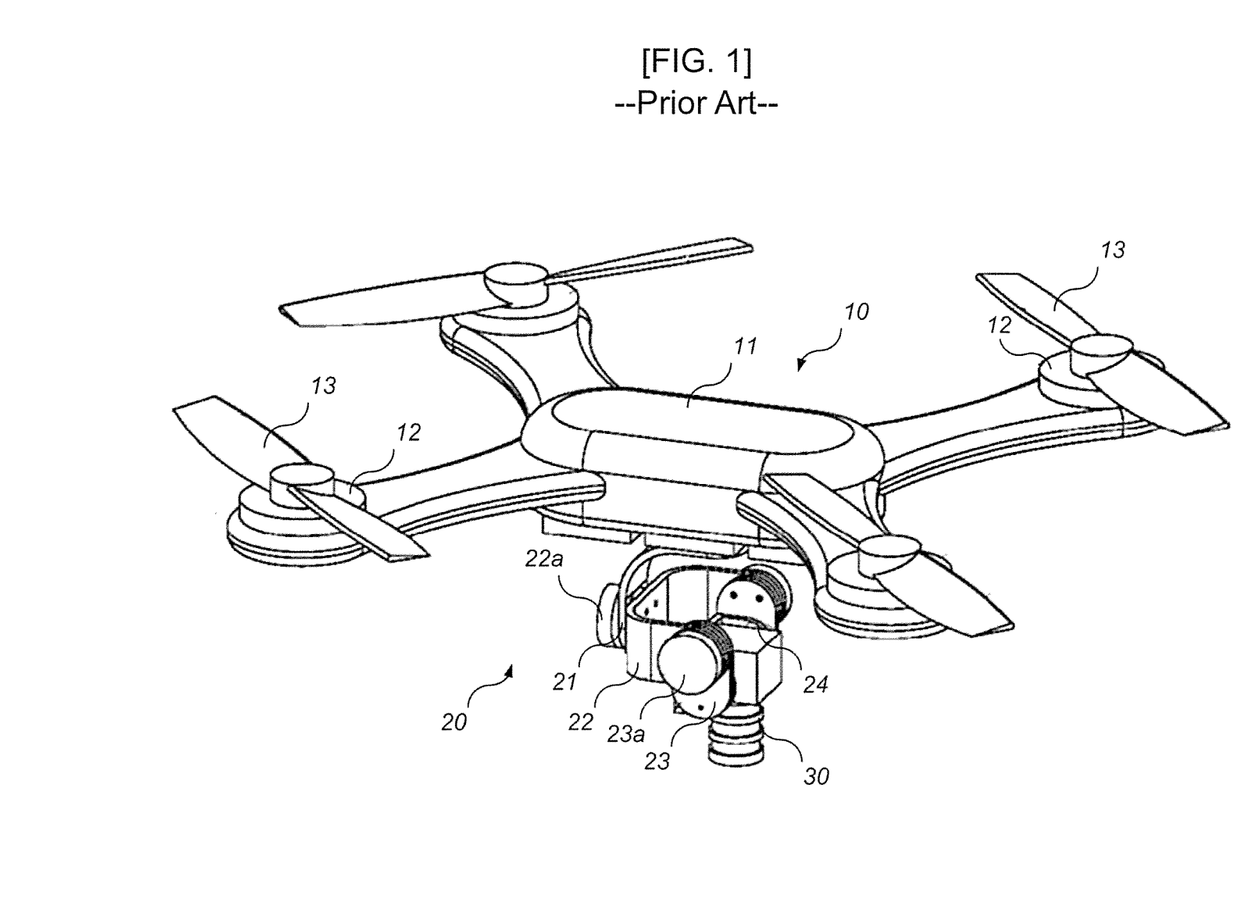
FIG. 1 is a diagram showing an unmanned aerial vehicle system for photography according to the related art.
Figure 2:
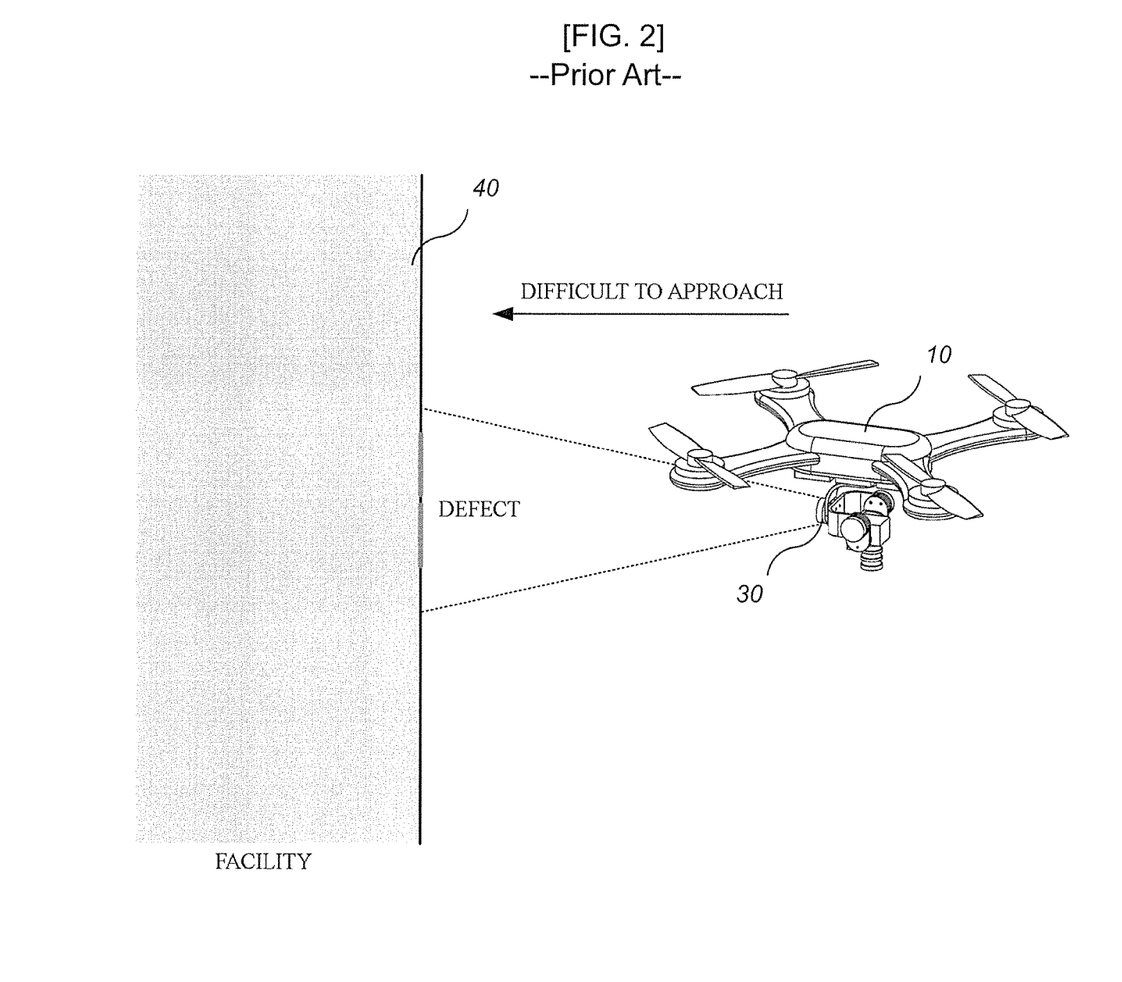
FIG. 2 is a diagram illustrating that close-up photography is not easy for the unmanned aerial vehicle system for photography shown in FIG. 1.

FIG. 1 is a diagram showing an unmanned aerial vehicle system for photography according to the related art, and FIG. 2 is a diagram illustrating that close-up photography is not easy for the unmanned aerial vehicle system for photography shown in FIG. 1.

In an unmanned aerial vehicle system for photography according to the related art, as shown in FIG. 1, a drone 10 includes a drone body 11 and propellers 13 driven by a plurality of propeller motors 12, a gimbal 20 is combined with a lower part of the drone 10, and a camera 30 is installed in the gimbal 20.

The gimbal 20 includes a support 21 combined with the lower part of the drone 10, a roll operator 22 supported by the support 21 to enable a roll operation, a pitch operator 23 supported by the roll operator (22) to enable a pitch operation, and a camera mount 24 which is combined with the pitch operator 23 and on which the camera 30 is installed.

The roll operator 22 and the pitch operator 23 are configured to respectively perform a roll operation and a pitch operation by a roll motor 22a and a pitch motor 23a which are driven according to horizontality sensed by a horizontality sensor (not shown) so that the camera 30 installed on the camera mount 24 maintains horizontality.

According to an unmanned photography technology using such a drone, the drone 10 is remotely controlled using a remote drone controller to capture images of a target with the camera 30 which is kept horizontal by the gimbal 20 while flying over the target, and the captured images are transmitted to a server (not shown) on the ground so that the target can be monitored.

However, most unmanned aerial vehicle systems for photography according to the related art photograph a facility 40 at long range using the camera 30 installed in the drone 10 to photograph defects, etc. of the facility 40. The drone 10 should come close to the facility 40 to take a close-up picture of the facility 40 at short range. However, it is uneasy for the drone 10 to approach the facility 40, and there is a high probability that the drone 10 will crash and fall while coming close to the facility 40.

According to the related art, an unmanned aerial vehicle is controlled autonomously or by a person, and thus it is difficult to come close to a structure. Also, in the case of a large structure, such as a skyscraper, a long-span bridge, etc., it is difficult to fix the unmanned aerial vehicle due to strong wind, a vortex, a gust of wind, etc. existing around the structure, and thus it is impossible to capture a high-precision image with high resolution. Further, attempts to come close to a structure without approach equipment and software have safety problems, such as a drone colliding with a facility.

SUMMARY OF THE INVENTION

The present invention is directed to providing an unmanned aerial vehicle system for taking a close-up picture of a facility that can safely bring a drone, which is an unmanned aerial vehicle, close to a facility surface, which is a subject, using supports and settling members to precisely photograph damage, deterioration, and defects on the facility surface, and a photography method using the unmanned aerial vehicle system.

The present invention is also directed to providing an unmanned aerial vehicle system for taking a close-up picture of a facility that can safely bring an unmanned aerial vehicle close to a facility and fix the unmanned aerial vehicle on a facility in a perpendicular direction with respect to a subject surface of the facility to improve the quality of an image captured by a camera when the unmanned aerial vehicle is remotely controlled or autonomously navigates, and a photography method using the unmanned aerial vehicle system.

The present invention is also directed to providing an unmanned aerial vehicle system for taking a close-up picture of a facility in which a rotary body is integrally formed with a camera and supports in an unmanned aerial vehicle and rotated 0 degrees to 360 degrees to perpendicularly face a facility surface, which is a subject, when a close-up photography instruction is received, and can autonomously navigate or can be remotely controlled using an automatic range finder until arriving at a preset safe distance, and a photography method using the unmanned aerial vehicle system.

According to an aspect of the present invention, there is provided an unmanned aerial vehicle system for taking a close-up picture of a facility, the system including: an unmanned aerial vehicle configured to include a rotary body, a propeller motor, and a propeller, be remotely controlled using an unmanned aerial vehicle controller, and fly and come close to a facility; the unmanned aerial vehicle controller configured to remotely control the unmanned aerial vehicle through wireless communication; a camera configured to be installed in the unmanned aerial vehicle to rotate with the rotary body and photograph the facility; at least two supports configured to be installed in the unmanned aerial vehicle and rotate with the rotary body so that the unmanned aerial vehicle can come close to the facility, and configured to separately extend to a surface of the facility in a perpendicular direction so that a predetermined distance is maintained between the unmanned aerial vehicle and the facility; support settling members configured to be separately installed at ends of the supports and attached to the surface of the facility so that the camera can take a close-up picture of the facility; and a range finder configured to be installed in the unmanned aerial vehicle and measure a distance between the camera and the facility, wherein the camera takes a close-up picture of damage, a defect, or deterioration of the facility when the unmanned aerial vehicle comes close to the facility and is settled by the support settling members.

The rotary body of the unmanned aerial vehicle may rotate 0 degrees to 360 degrees together with the camera and the supports according to operation of a body rotator.

The at least two supports may be used as unmanned aerial vehicle supports when the unmanned aerial vehicle does not fly, may be used as landing supports when the unmanned aerial vehicle lands, and may extend to the surface of the facility in the perpendicular direction when close-up photography is performed using the camera.

The support settling members may be settled on the surface of the facility by vacuum suction or electromagnetic attachment.

The range finder may be a laser or ultrasonic transceiver and measure the distance between the surface of the facility, which is a subject, and the camera.

The unmanned aerial vehicle system may further include a lighting provider configured to be installed in the unmanned aerial vehicle and provide lighting to the surface of the facility when the facility is photographed through the camera.

The unmanned aerial vehicle system may further include: a monitor configured to be connected to the unmanned aerial vehicle controller and display the picture taken by the camera; and a facility damage determiner configured to signal-process data of the picture taken by the camera and analyze and determine whether or not there is damage, deterioration, or a defect on the facility.

The unmanned aerial vehicle may include: a wireless communication module configured to receive a remote control signal from the unmanned aerial vehicle controller and transmit an image signal obtained by the camera to the unmanned aerial vehicle controller; a controller configured to control a flight unit according to the remote control signal received through the wireless communication module, control operation of the camera, and control the wireless communication module so that data obtained by the camera is transmitted to the unmanned aerial vehicle controller; a memory configured to store the data obtained by the camera; the flight unit configured to be operated under control of the controller and cause the unmanned aerial vehicle to fly according to the remote control signal transmitted to the unmanned aerial vehicle controller; a battery configured to supply power to the wireless communication module, the controller, the memory, and the flight unit; and a body rotator configured to operate so that the supports extend to the surface of the facility in the perpendicular direction.

The body rotator may include: a rotary motor configured to be coupled to a rotation shaft and rotate the rotation shaft so that the rotary body is rotated; and a rotation shaft brake configured to be coupled to the rotation shaft and stop rotation of the rotation shaft.

The camera may take a close-up picture of a side surface, a lower surface, or an inclined surface of the facility when a predetermined distance is ensured between the unmanned aerial vehicle and the facility.

According to another aspect of the present invention, there is provided a photography method using an unmanned aerial vehicle for taking a close-up picture of a facility, the method including: a) when it is necessary to take a close-up picture of a facility, measuring a distance to the facility using a range finder installed in the unmanned aerial vehicle; b) causing the unmanned aerial vehicle to fly and come close to the facility while checking a location of the facility through a monitor connected to an unmanned aerial vehicle controller; c) rotating a rotary body by operating a body rotator installed in the unmanned aerial vehicle; d) extending at least two supports to a surface of the facility in a perpendicular direction; e) causing support settling members separately installed at fore-ends of the extended supports to be very close to the surface of the facility; f) settling the support settling members on the surface of the facility so that a predetermined distance is maintained between the unmanned aerial vehicle and the facility; and g) taking a close-up picture of the surface of the facility with a camera installed in the unmanned aerial vehicle, wherein the camera takes a close-up picture of damage, a defect, or deterioration of the facility when the unmanned aerial vehicle comes close to the facility and is settled by the support settling members.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those of ordinary skill in the art that various modifications can be made without departing from the spirit and scope of the invention. Parts irrelevant to the description will be omitted from the drawings to clearly describe the present invention, and like reference numerals designate like elements throughout the specification.

When a part is referred to as "including" an element, it does not exclude another element and can further include another element unless specified otherwise. Further, the terms "unit," etc. used in the specification represent a unit for processing at least one function or operation and may be implemented by hardware, software, or a combination thereof.

[Unmanned Aerial Vehicle System 100 for Taking Close-Up Picture of Facility]

Figure 3:
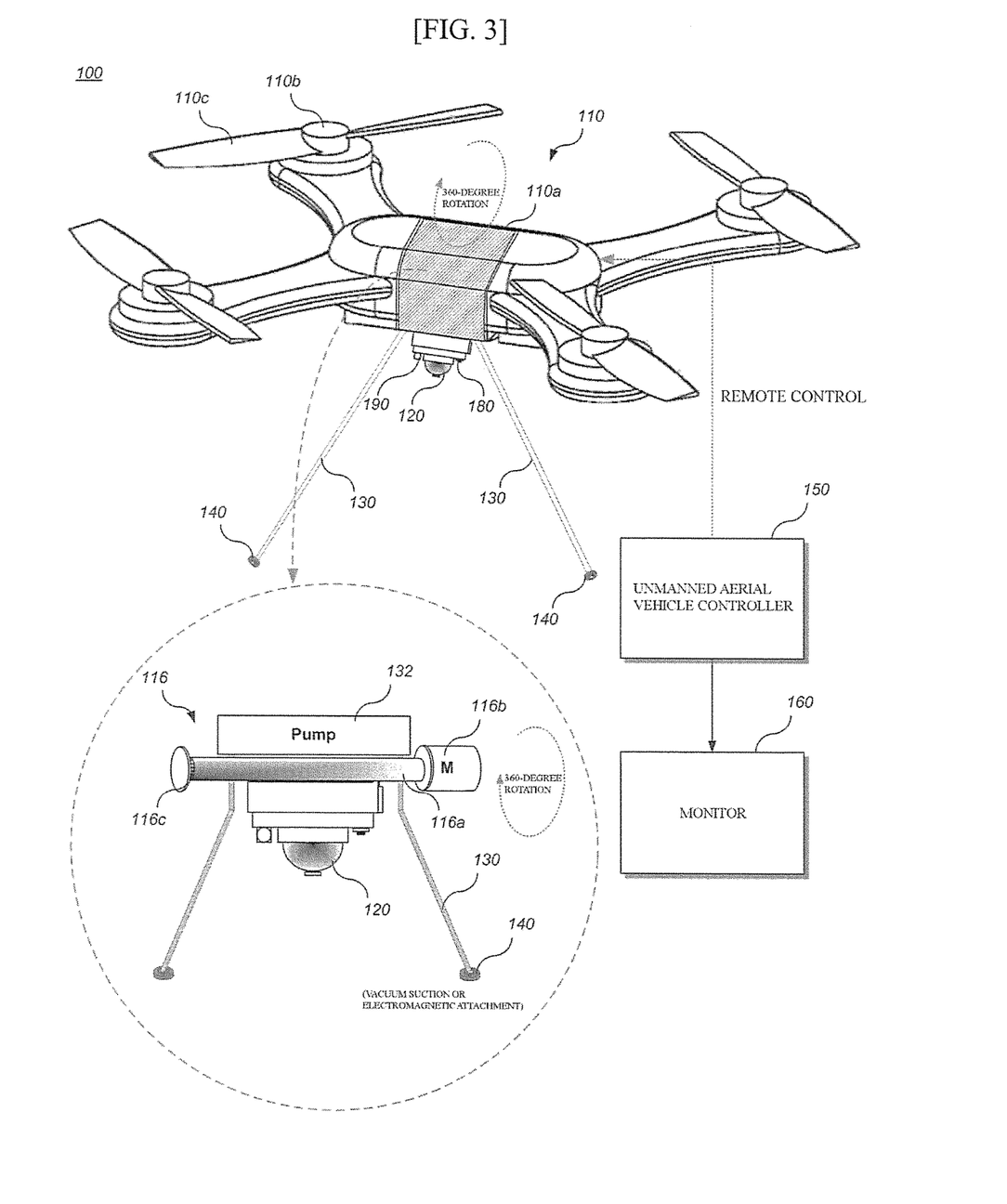
FIG. 3 is a schematic diagram of an unmanned aerial vehicle system for taking a close-up picture of a facility according to an exemplary embodiment of the present invention.
Figure 4:
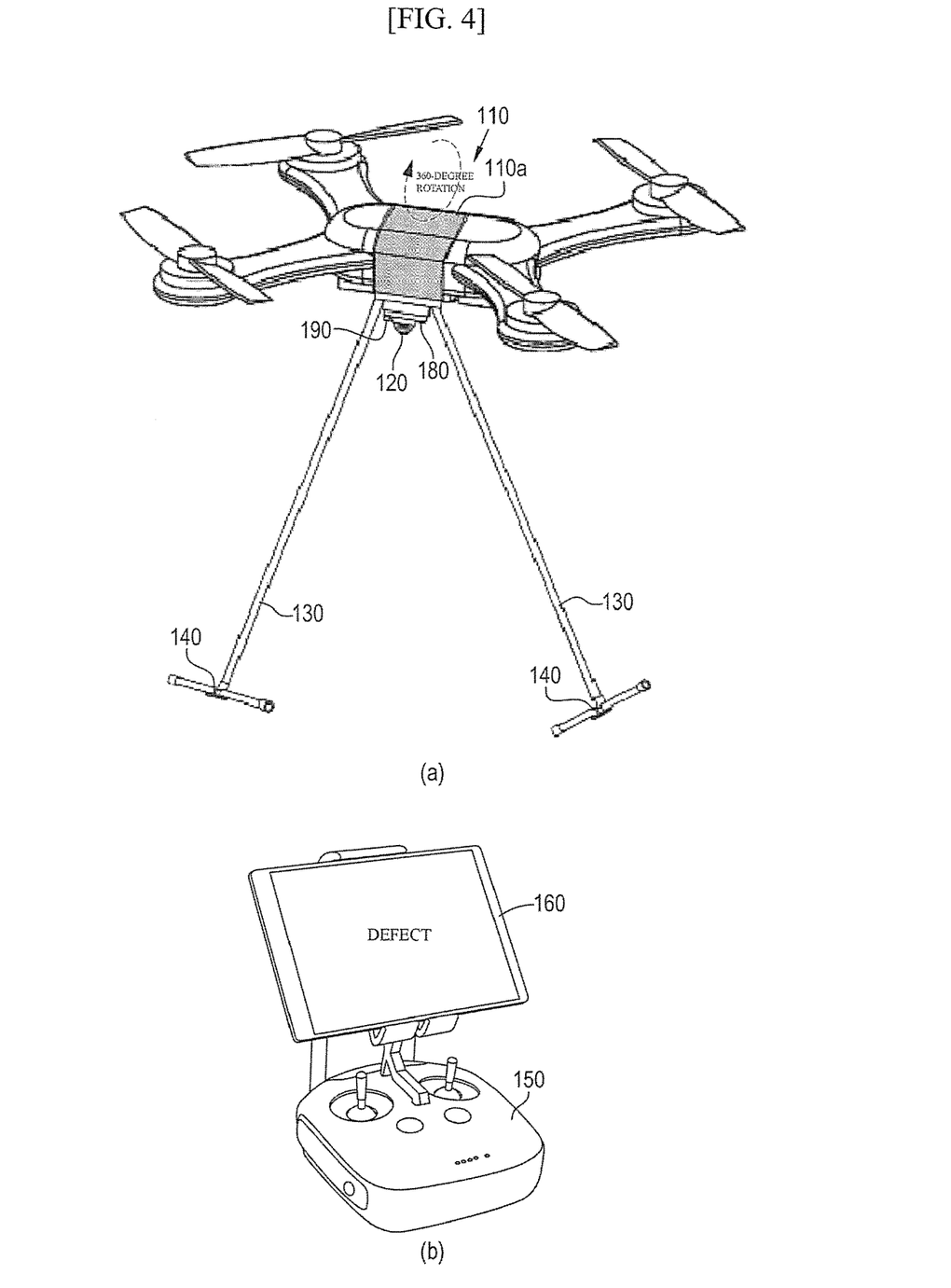
FIG. 4 is a diagram showing an example of an unmanned aerial vehicle and an unmanned aerial vehicle controller in an unmanned aerial vehicle system for taking a close-up picture of a facility according to an exemplary embodiment of the present invention.

FIG. 3 is a schematic diagram of an unmanned aerial vehicle system for taking a close-up picture of a facility according to an exemplary embodiment of the present invention, and FIG. 4 is a diagram showing an example of an unmanned aerial vehicle and an unmanned aerial vehicle controller in an unmanned aerial vehicle system for taking a close-up picture of a facility according to an exemplary embodiment of the present invention.

Referring to FIG. 3, an unmanned aerial vehicle system 100 for taking a close-up picture of a facility according to an exemplary embodiment of the present invention includes an unmanned aerial vehicle 110, a camera 120, supports 130, support settling members 140, an unmanned aerial vehicle controller 150, and a monitor 160. Here, the unmanned aerial vehicle 110 includes a rotary body 110a, propeller motors 110b, and propellers 110c.

In the unmanned aerial vehicle system 100 for taking a close-up picture of a facility according to an exemplary embodiment of the present invention, the supports 130 and the support settling members 140 are installed on the unmanned aerial vehicle 110 so that the camera 120 installed in a drone, which is the unmanned aerial vehicle 110, can come close to a facility or a structure for close-up photography when the camera 120 is used to photograph damage, deterioration, defects, etc. of the facility for a safety assessment of the facility or the structure. Here, the supports 130 can be implemented to be rotatable, and the support settling members 140 can be implemented by vacuum suction or electromagnetic attachment.

As shown in FIG. 3, the unmanned aerial vehicle 110 includes the rotary body 110a, the propeller motors 110b, and the propellers 110c, and additionally includes a flight unit and a wireless communication module therein. Also, the camera, the supports 130, and the support settling members 140 are installed on the rotary body 110a and rotate.

In the unmanned aerial vehicle system 100 for taking a close-up picture of a facility according to an exemplary embodiment of the present invention, the unmanned aerial vehicle 110 has at least two supports 130, and the support settling members 140 are provided at ends of the supports 130.

As shown FIG. 3, the rotary body 110a is integrally formed with the camera 120 and the supports 130 and rotates with the camera 120 and the supports 130 by a body rotator 116, and the body rotator 116 is coupled to the rotary body 110a through the rotation shaft 116a. Since the rotary body 110a can be rotated 0 degrees to 360 degrees due to the body rotator 116 according to an exemplary embodiment of the present invention, the camera 120 operates to face a facility 200 which is a subject from a facility approach operation to a facility photography operation.

Also, as shown in a lower part of FIG. 3, the rotation shaft 116a, a rotary motor 116b, and a rotation shaft brake 116c are installed to operate the body rotator 116 in the rotary body 110a, and at least two supports 130 are coupled to the body rotator 116.

Therefore, in the unmanned aerial vehicle 110 of the unmanned aerial vehicle system 100 for taking a close-up picture of a facility according to an exemplary embodiment of the present invention, the rotary body 110a integrated with the camera 120 and the supports 130 is formed as shown in FIG. 3. When a close-up photography instruction is received, the body rotator 116 rotates the rotary body 110a 0 degrees to 360 degrees to perpendicularly face a facility surface which is a subject, and autonomous navigation or remote control is possible using an automatic range finder until the unmanned aerial vehicle 110 arrives at a preset safe distance.

In the unmanned aerial vehicle system 100 for taking a close-up picture of a facility according to an exemplary embodiment of the present invention, a range finder 180, such as a laser or ultrasonic transceiver, etc., that can accurately measure a distance between a subject and the camera 120 is provided on one side of the camera 120, and it is possible to automatically ensure a safe distance between the facility 200 which is a subject and the unmanned aerial vehicle 110 using the range finder 180. Here, since the distance between the facility 200 which is a subject and the camera 120 is preset to be similar to a length of the supports 130, the range finder 180 operates to automatically maintain the safe distance when the unmanned aerial vehicle is in a remote or autonomous navigation mode. Also, a support settling member 140 which is a vacuum suction device or an electromagnetic attachment device is provided at each of the ends of the supports 130. For example, a vacuum pump 132 is installed on one side of the supports 130 to enable vacuum suction through hollows in the supports 130 so that the support settling members 140 can be settled on a surface of a structure.

In the unmanned aerial vehicle system 100 for taking a close-up picture of a facility according to an exemplary embodiment of the present invention, as shown in a) of FIG. 4, the at least two supports 130 installed on the unmanned aerial vehicle 110 are used as unmanned aerial vehicle supports when the unmanned aerial vehicle 110 does not fly, used as landing supports when the unmanned aerial vehicle 110 lands, and extend to a surface of the facility 200 in a perpendicular direction when close-up photography is performed using the camera 120.

In the unmanned aerial vehicle system 100 for taking a close-up picture of a facility according to an exemplary embodiment of the present invention, when the unmanned aerial vehicle 110 comes close to a facility using global positioning system (GPS) coordinates, etc. through an instruction of an administrator or autonomous navigation and then receives a close-up photography instruction for a predetermined portion of the facility, for example, the range finder 180 and software of the installed proximity access system operate so that photography of the predetermined portion of a surface of the facility is started. At this time, a distance between the facility surface which is a subject and the unmanned aerial vehicle 110 is measured by the range finder 180, and flight or navigation of the unmanned aerial vehicle 110 may be performed with a navigation program of the proximity access system until the distance between the camera 120 and the facility 200 which is a subject becomes the preset safe distance and the supports 130 are settled on the facility 200.

When the unmanned aerial vehicle 110 receives the instruction to take a close-up picture of the facility, the rotary motor 116b operates to rotate the rotary body 110a, and the rotation shaft brake 116c operates to fix the rotation shaft 116a so that the supports 130 installed on the unmanned aerial vehicle 110 are perpendicularly put on the facility surface which is a subject. Also, the rotary motor 116b of the body rotator 116 is coupled to the rotation shaft 116a and rotates the rotation shaft 116a, and the rotation shaft brake 116c of the body rotator 116 is coupled to the rotation shaft 116a and serves to stop rotation of the rotation shaft 116a.

When the facility surface which is a subject is not steel, for example, vacuum suction holes which are the support settling members 140 are absorbed on the facility surface which is a subject due to a vacuum force of the vacuum pump 132. Also, when the facility surface is steel, power is applied to, for example, electromagnetic attachment devices which are the support settling members 140, and the electromagnetic attachment devices are settled and fixed on the facility surface which is steel according to the principle of an electromagnet.

In the unmanned aerial vehicle system 100 for taking a close-up picture of a facility according to an exemplary embodiment of the present invention, the camera 120 can generally rotate and has a zoom-in function. Therefore, as shown in b) of FIG. 4, an operator of the unmanned aerial vehicle 110 can remotely check a state of the facility surface with the naked eye through the unmanned aerial vehicle controller 150 and the monitor 160 and photograph the state thereof, or the unmanned aerial vehicle 110 can come close to the facility and automatically photograph the surface of the facility.

In the unmanned aerial vehicle system 100 for taking a close-up picture of a facility according to an exemplary embodiment of the present invention, the supports 130 may preferably number at least two. For example, there can be three supports like a tripod of a camera or four supports as shown in the drawing. Even when the surface of the facility which is a subject is not a flat surface, close-up photography is possible due to the support settling members 140.

In particular, it is possible to use a physical force between the unmanned aerial vehicle 110 and the facility 200 due to operation of the support settling members 140. Therefore, for example, when a robot is installed in a drone which is the unmanned aerial vehicle 110, exploration and maintenance of the facility surface, gathering of evidence of a surface material, etc. may be possible by contact with the facility surface. Also, the camera 120 can take a close-up picture of a side surface, a lower surface, or an inclined surface of the facility 300 when a predetermined distance is ensured between the unmanned aerial vehicle 110 and the facility 200.

As shown in a) of FIG. 4, the camera 120, the at least two supports 130, and the support settling members 140 are installed on the unmanned aerial vehicle 110.

Specifically, the unmanned aerial vehicle 110 includes the rotary body 110a, the plurality of propeller motors 110b, and the plurality of propellers 110c, and also includes a gimbal combined with a lower part of the rotary body 110a. Since the gimbal is installed, it is possible to maintain horizontality due to the gimbal.

As shown in b) of FIG. 4, the unmanned aerial vehicle controller 150 remotely controls the unmanned aerial vehicle 110 in a wireless manner, and the monitor 160 is connected to the unmanned aerial vehicle controller 150 and displays images captured by the camera 120. Accordingly, the unmanned aerial vehicle operator can check the surface of the facility 200 displayed on the monitor 160 and take a close-up picture of the surface of the facility 200 through the camera 120.

A lighting provider 190 is installed in the unmanned aerial vehicle 110 and provides lighting to the surface of the facility 200 when the facility 200 is photographed through the camera 120.

Figure 5:
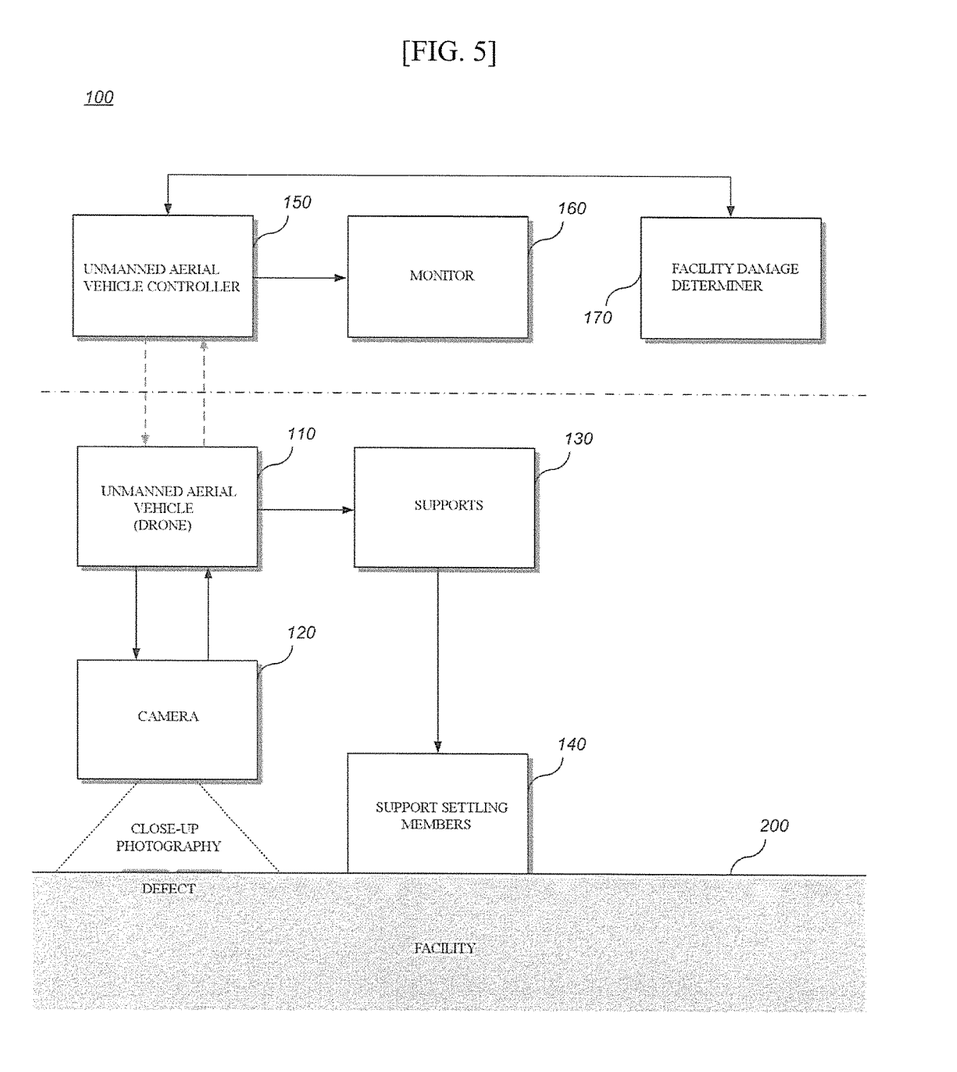
FIG. 5 is a block diagram of an unmanned aerial vehicle system for taking a close-up picture of a facility according to an exemplary embodiment of the present invention.
Figure 6:
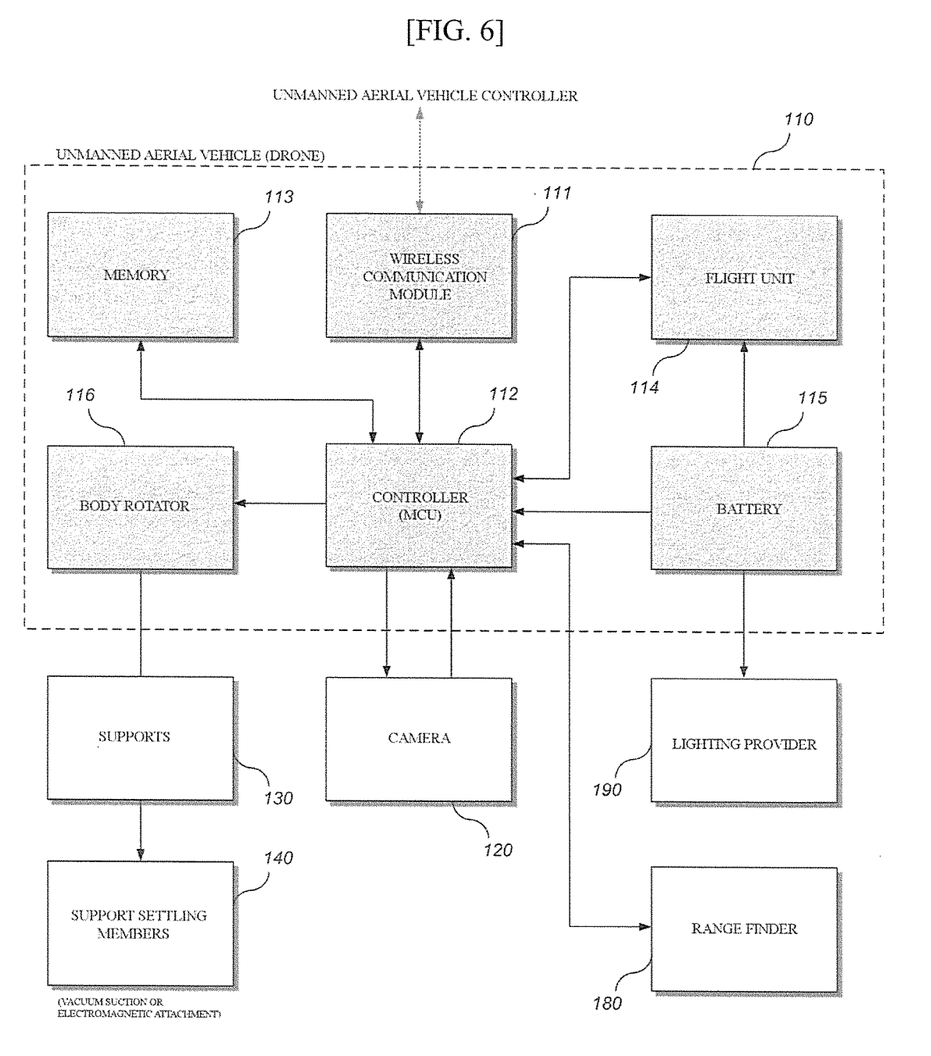
FIG. 6 is a detailed block diagram of an unmanned aerial vehicle in an unmanned aerial vehicle system for taking a close-up picture of a facility according to an exemplary embodiment of the present invention.

FIG. 5 is a block diagram of an unmanned aerial vehicle system for taking a close-up picture of a facility according to an exemplary embodiment of the present invention, and FIG. 6 is a detailed block diagram of an unmanned aerial vehicle in an unmanned aerial vehicle system for taking a close-up picture of a facility according to an exemplary embodiment of the present invention.

Referring to FIG. 5, the unmanned aerial vehicle system 100 for taking a close-up picture of a facility according to an exemplary embodiment of the present invention includes the unmanned aerial vehicle 110, the camera 120, the supports 130, the support settling members 140, the unmanned aerial vehicle controller 150, the monitor 160, a facility damage determiner 170, the range finder 180, and the lighting provider 190.

The unmanned aerial vehicle 110 which is a drone is remotely controlled using the unmanned aerial vehicle controller 150 and is flown to come close to the facility 200.

Specifically, as shown in FIG. 6, the unmanned aerial vehicle 110 includes a wireless communication module 111, a controller 112, a memory 113, a flight unit 114, a battery 115, and the body rotator 116.

The wireless communication module 111 of the unmanned aerial vehicle 110 receives a remote control signal from the unmanned aerial vehicle controller 150 and transmits an image signal obtained by the camera 120 to the unmanned aerial vehicle controller 150.

The controller 112 of the unmanned aerial vehicle 110 is implemented as, for example, a micro controller unit (MCU). The controller 112 controls the flight unit 114 according to the remote control signal received through the wireless communication module 111, controls operation of the camera 120, and controls the wireless communication module 111 so that data obtained by the camera 120 is transmitted to the unmanned aerial vehicle controller 150.

The memory 113 of the unmanned aerial vehicle 110 stores the data obtained by the camera 120.

The flight unit 114 of the unmanned aerial vehicle 110 is operated under control of the controller 112 to cause the unmanned aerial vehicle 110 to fly according to the remote control signal transmitted to the unmanned aerial vehicle controller 150.

The battery 115 of the unmanned aerial vehicle 110 supplies power to the wireless communication module 111, the controller 112, the memory 113, and the flight unit 114. Also, the battery 115 can supply power to the body rotator 116, the camera 120, the range finder 180, the lighting provider 190, and so on.

The body rotator 116 of the unmanned aerial vehicle 110 operates so that the supports 130 extend to the surface of the facility 200 in a perpendicular direction.

Referring back to FIG. 5, the unmanned aerial vehicle controller 150 remotely controls the unmanned aerial vehicle 110 through wireless communication.

The camera 120 is installed in the unmanned aerial vehicle 110 to be rotatable and photographs the facility 200.

The supports 130 number at least two. The supports 130 are installed on the unmanned aerial vehicle 110 so that the unmanned aerial vehicle 110 can come close to the facility 200, and extend to the surface of the facility 200 in a perpendicular direction so that the predetermined distance is maintained between the unmanned aerial vehicle 110 and the facility 200.

The support settling members 140 are installed at ends of the supports 130 and attached to the surface of the facility 200 so that the camera 120 can take a close-up picture of the facility 200.

The monitor 160 is connected to the unmanned aerial vehicle controller 150 and displays an image captured by the camera 120.

The range finder 180 is installed in the unmanned aerial vehicle 110 and measures a distance between the camera 120 and the facility 200.

The lighting provider 190 is installed in the unmanned aerial vehicle 110 and provides lighting to the surface of the facility 200 when the facility 200 is photographed through the camera 120.

The facility damage determiner 170 may signal-process data of the image captured by the camera 120 and analyze and determine whether or not there is damage, deterioration, or a defect on the facility 200.

Therefore, when the unmanned aerial vehicle 110 approaches the facility 200 and is settled by the support settling members 140, the camera 120 can take a close-up picture of damage, a defect, or deterioration of the facility 200.

Figure 7:
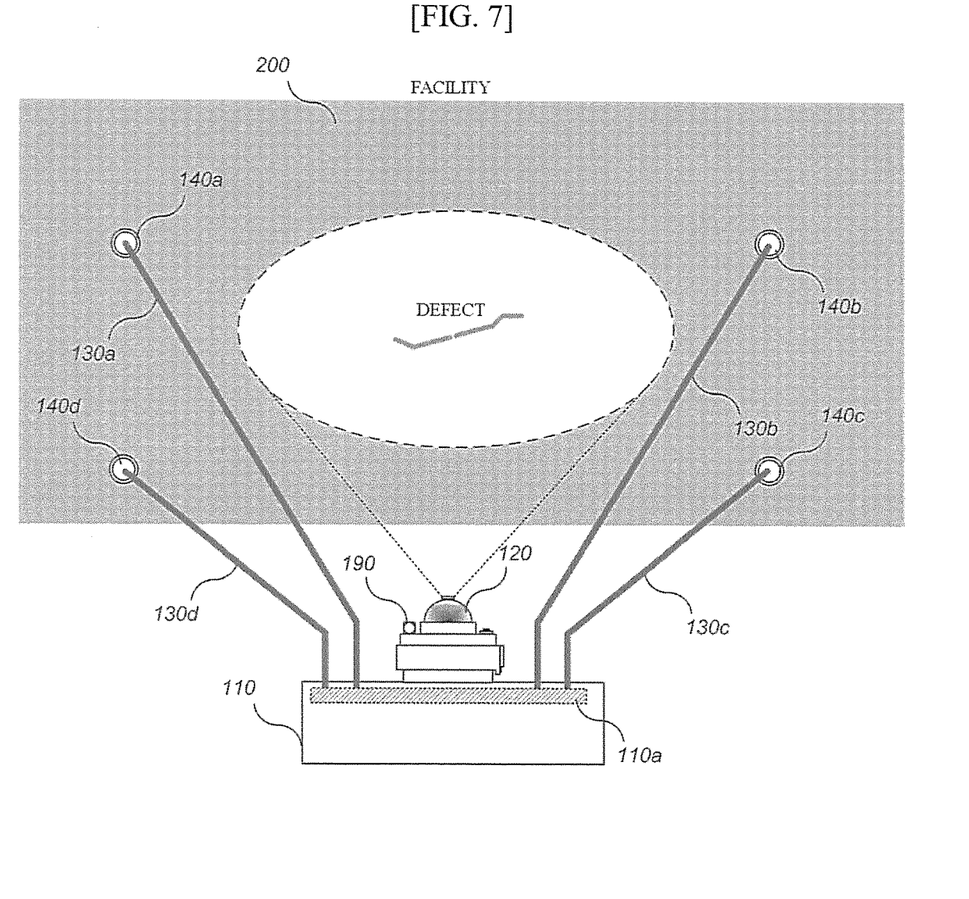
FIG. 7 is a diagram showing that an unmanned aerial vehicle for taking a close-up picture of a facility according to an exemplary embodiment of the present invention settles four support settling members on a surface of a facility and takes a close-up picture of the facility.

FIG. 7 is a diagram showing that an unmanned aerial vehicle for taking a close-up picture of a facility according to an exemplary embodiment of the present invention settles four support settling members on a surface of a facility and takes a close-up picture of the facility.

Referring to FIG. 7, the unmanned aerial vehicle system 100 for taking a close-up picture of a facility according to an exemplary embodiment of the present invention includes, for example, first to fourth supports 130a to 130d and first to fourth support settling members 140a to 140d and can take a close-up picture of a defect, etc. of the surface of the facility 200. At this time, after a distance to the surface of the facility 200 is measured through the range finder 180, the unmanned aerial vehicle 110 can be automatically brought close to the surface until arriving at the preset safe distance, and lighting can be provided through the lighting provider 190.

Figure 8:
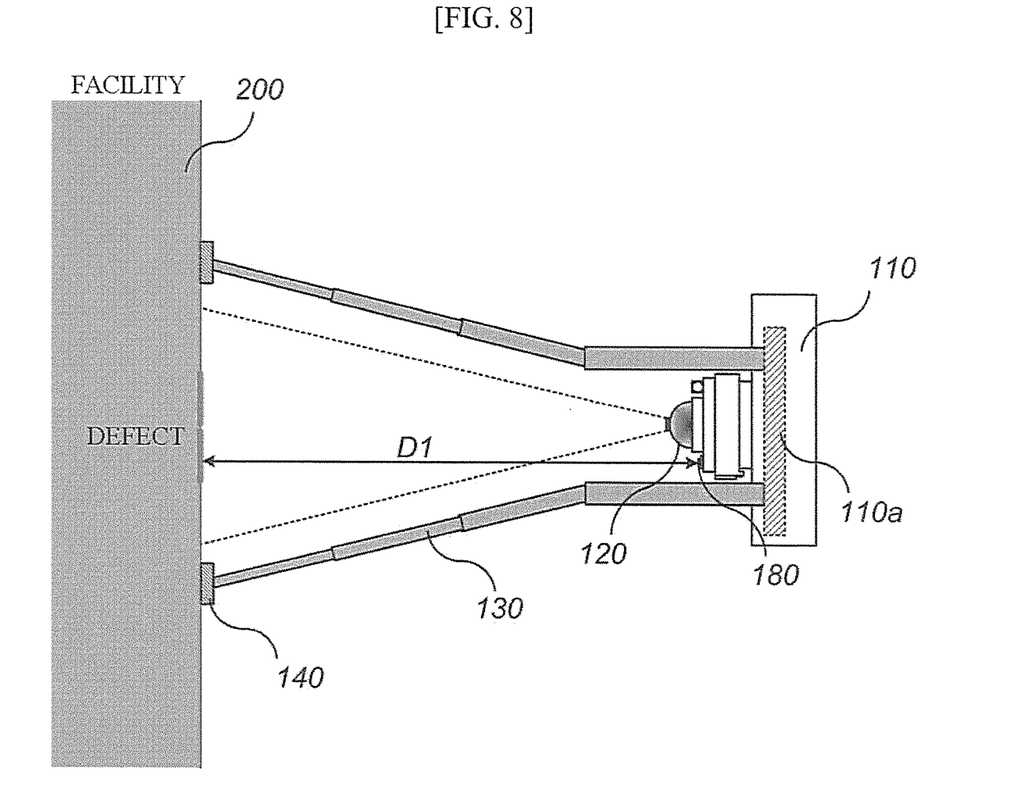
FIG. 8 is a diagram showing that an unmanned aerial vehicle for taking a close-up picture of a facility according to an exemplary embodiment of the present invention takes a close-up picture of a side surface of a facility.
Figure 9:
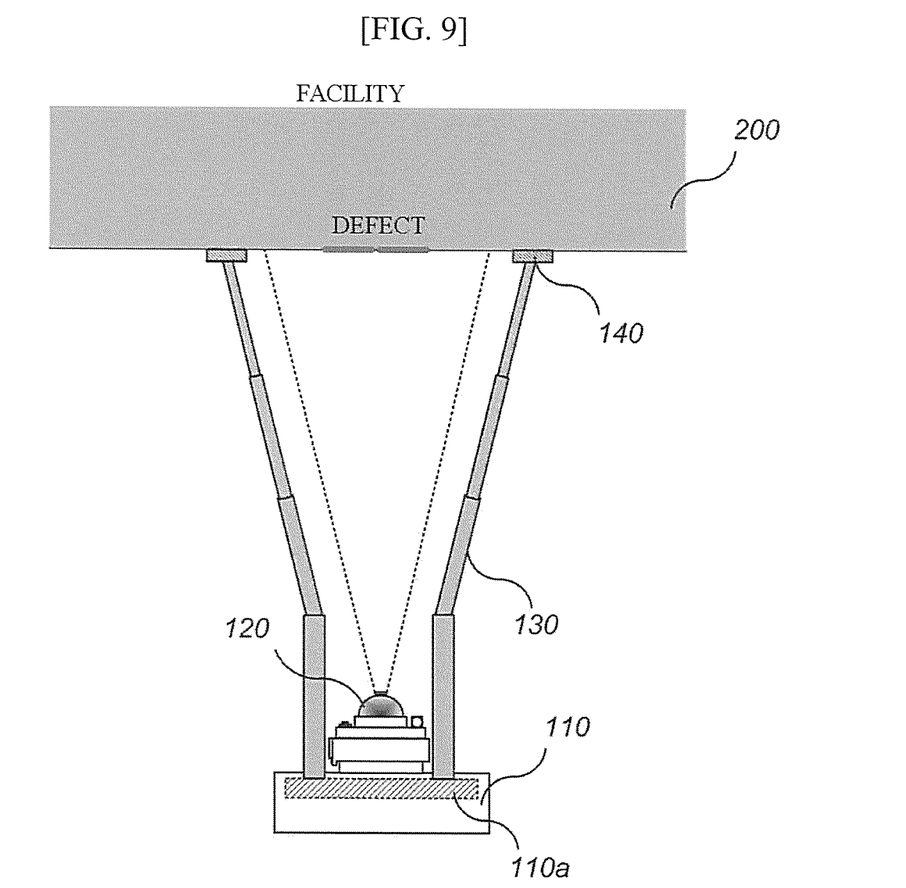
FIG. 9 is a diagram showing that an unmanned aerial vehicle for taking a close-up picture of a facility according to an exemplary embodiment of the present invention takes a close-up picture of a lower surface of a facility.
Figure 10:
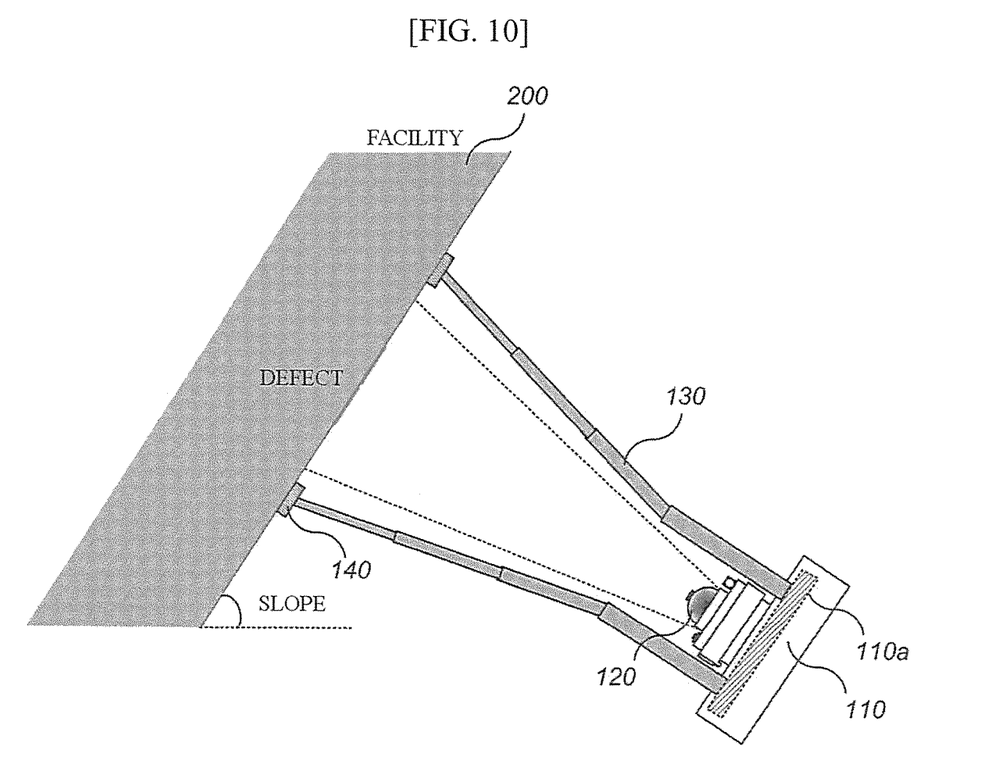
FIG. 10 is a diagram showing that an unmanned aerial vehicle for taking a close-up picture of a facility according to an exemplary embodiment of the present invention takes a close-up picture of an inclined surface of a facility.

FIG. 8 is a diagram showing that an unmanned aerial vehicle for taking a close-up picture of a facility according to an exemplary embodiment of the present invention takes a close-up picture of a side surface of a facility, FIG. 9 is a diagram showing that an unmanned aerial vehicle for taking a close-up picture of a facility according to an exemplary embodiment of the present invention takes a close-up picture of a lower surface of a facility, and FIG. 10 is a diagram showing that an unmanned aerial vehicle for taking a close-up picture of a facility according to an exemplary embodiment of the present invention takes a close-up picture of an inclined surface of a facility.

As shown in FIG. 8, the unmanned aerial vehicle system 100 for taking a close-up picture of a facility according to an exemplary embodiment of the present invention accurately measures a distance to the surface of the facility 200 using the range finder 180, and then the camera 120 can take a close-up picture of a side surface of the facility 200 when the predetermined distance is ensured between the unmanned aerial vehicle 110 and the facility 200. Also, as shown in FIG. 9, the unmanned aerial vehicle system 100 for taking a close-up picture of a facility according to an exemplary embodiment of the present invention can take a close-up picture of a lower surface of the facility 200 using the camera 120 when the predetermined distance is ensured between the unmanned aerial vehicle 110 and the facility 200. Further, as shown in FIG. 10, the unmanned aerial vehicle system 100 for taking a close-up picture of a facility according to an exemplary embodiment of the present invention can take a close-up picture of an inclined surface of the facility 200 using the camera 120 when the predetermined distance is ensured between the unmanned aerial vehicle 110 and the facility 200.

Consequently, according to a unmanned aerial vehicle system for taking a close-up picture of a facility according to an exemplary embodiment of the present invention, a drone which is an unmanned aerial vehicle can be safely brought close to a facility surface which is a subject using supports and settling members so that damage, deterioration, and defects on the facility surface can be photographed more precisely.

[Photography Method Using Unmanned Aerial Vehicle System for Taking Close-Up Picture of Facility]

Figure 11:
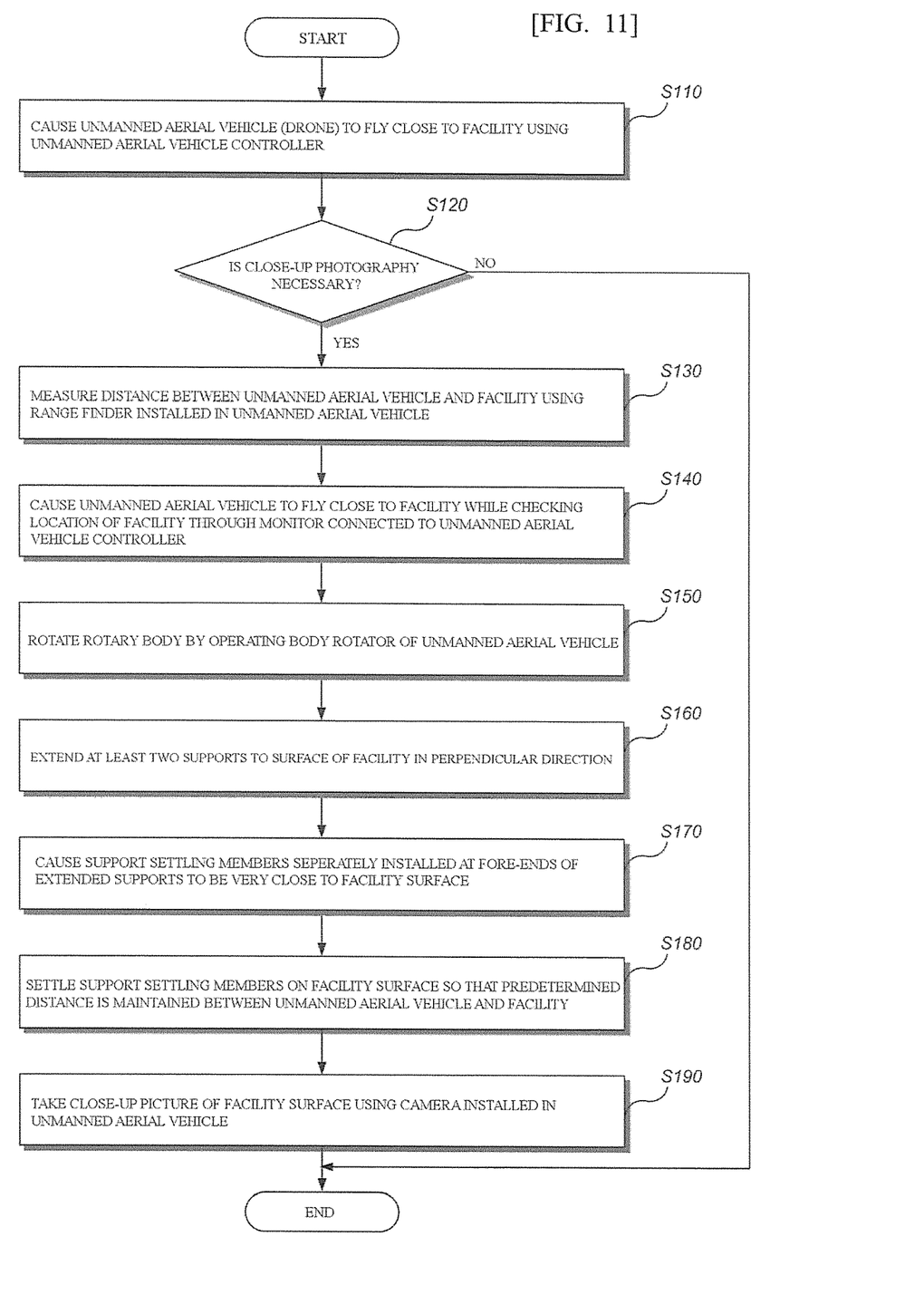
FIG. 11 is an operational flowchart of a photography method using an unmanned aerial vehicle system for taking a close-up picture of a facility according to an exemplary embodiment of the present invention.

FIG. 11 is an operational flowchart of a photography method using an unmanned aerial vehicle system for taking a close-up picture of a facility according to an exemplary embodiment of the present invention.

Referring to FIG. 11, in a photography method using an unmanned aerial vehicle system for taking a close-up picture of a facility according to an exemplary embodiment of the present invention, a drone which is the unmanned aerial vehicle 110 is remotely controlled using the unmanned aerial vehicle controller 150 to fly close to the facility 200 first (S110).

Next, it is determined whether it is necessary to take a close-up picture of the facility 200 with the unmanned aerial vehicle 110 (S120). For example, the facility 200 is photographed at long range through the camera 120 installed in the unmanned aerial vehicle 110. Then, it is first identified whether or not there is damage, deterioration, or a defect on the facility 200, and it is determined whether or not it is necessary to take a close-up picture of the facility 200.

Next, when it is necessary to take a close-up picture of the facility 200, a distance to the facility 200 is measured using the range finder 180 installed in the unmanned aerial vehicle 110 (S130). Here, the range finder 180 which is a laser or ultrasonic transceiver can accurately measure a distance between the surface of the facility 200 which is a subject and the camera 120.

Next, while a location of the facility 200 is checked through the monitor 160 connected to the unmanned aerial vehicle controller 150, the unmanned aerial vehicle 110 is caused to fly close to the facility 200 (S140).

Next, the body rotator 116 installed in the unmanned aerial vehicle 110 is operated to rotate the rotary body 110a (S150).

Next, at least two supports 130 are extended to the surface of the facility 200 in a perpendicular direction (S160). Here, the supports 130 may preferably number at least two. For example, there can be three supports like a camera tripod or four supports as shown in FIG. 7 described above. The at least two supports 130 are used as unmanned aerial vehicle supports when the unmanned aerial vehicle 110 does not fly, used as landing supports when the unmanned aerial vehicle 110 lands, and extend to the surface of the facility 200 in the perpendicular direction when close-up photography is performed using the camera 120.

Next, the support settling members 140 separately installed at fore-ends of the extended supports 130 are forced to be very close to the surface of the facility 200 (S170).

Next, the support settling members 140 are settled on the surface of the facility 200 so that the predetermined distance is maintained between the unmanned aerial vehicle 110 and the facility 200 (S180). For example, the support settling members 140 settle the unmanned aerial vehicle 110 on the surface of the facility 200 by vacuum suction or electromagnetic attachment.

Next, a close-up picture of the surface of the facility 200 is taken by the camera 120 installed in the unmanned aerial vehicle 110 (S190). When the facility 200 is photographed through the camera 120, the lighting provider 190 installed in the unmanned aerial vehicle 110 may provide lighting to the surface of the facility 200. Also, the camera 120 can take a close-up picture of a side surface, a lower surface, or an inclined surface of the facility 200 when the predetermined distance is ensured between the unmanned aerial vehicle 110 and the facility 200.

Accordingly, when the unmanned aerial vehicle 110 comes close to the facility 200 and is settled by the support settling members 140, the camera 120 can take a close-up picture of damage, a defect, or deterioration of the facility 200, and subsequently, the facility damage determiner 170 can make a detailed determination of damage, deterioration, a defect, etc. of the facility 200 based on data of the close-up picture.

Consequently, according to exemplary embodiments of the present invention, a drone which is an unmanned aerial vehicle can be safely brought close to a facility surface which is a subject using supports and settling members to photograph damage, deterioration, a defect, etc. on the facility surface more precisely, and the unmanned aerial vehicle is safely brought close to the facility through remote control or autonomous navigation and fixed on the facility in a direction perpendicular to the facility surface so that quality of an image captured by a camera can be improved.

Also, a rotary body is integrally formed with a camera and supports in the unmanned aerial vehicle. Therefore, when a close-up photography instruction is received, the rotary body is rotated 0 degrees to 360 degrees to perpendicularly face a facility surface which is a subject, and autonomous navigation or remote control is possible using an automatic range finder until the unmanned aerial vehicle arrives at a preset safe distance. In addition, since it is possible to use a physical force between the unmanned aerial vehicle and the subject, the present invention can be readily used for inspection, maintenance, etc. using a robot.

According to exemplary embodiments of the present invention, an unmanned aerial vehicle can come close to a facility using a range finder installed therein to photograph damage, deterioration, and defects on a surface of the facility more precisely, and a drone which is the unmanned aerial vehicle can be temporarily settled on the surface of the facility which is a subject using supports and settling members.

According to exemplary embodiments of the present invention, the unmanned aerial vehicle safely comes close to the facility through remote control or autonomous navigation and is fixed on the facility in a direction perpendicular to the surface of the facility so that quality of an image captured by a camera can be improved.

According to exemplary embodiments of the present invention, a rotary body is integrally formed with a camera and supports in the unmanned aerial vehicle. Therefore, when a close-up photography instruction is received, the rotary body is rotated 0 degrees to 360 degrees to perpendicularly face the facility surface which is a subject, and autonomous navigation or remote control is possible using an automatic range finder until the unmanned aerial vehicle arrives at a preset safe distance.

According to exemplary embodiments of the present invention, since it is possible to use a physical force between the unmanned aerial vehicle and a subject, the present invention can be readily used for inspection, maintenance, etc. using a robot.

It should be apparent to those skilled in the art that various modifications can be made to the above-described exemplary embodiments of the present invention without departing from the spirit or scope of the invention. Thus, it is intended that the present invention covers all such modifications, provided they come within the scope of the appended claims and their equivalents.

What is claimed is:

1. An unmanned aerial vehicle system for taking a close-up picture of a facility, the unmanned aerial system comprising:
    an unmanned aerial vehicle configured to include a rotary body, a propeller motor, and a propeller, be remotely controlled using an unmanned aerial vehicle controller, and fly and come close to a facility;
    the unmanned aerial vehicle controller configured to remotely control the unmanned aerial vehicle through wireless communication;
    a camera configured to be installed in the unmanned aerial vehicle to rotate with the rotary body and photograph the facility;
    at least two supports configured to be installed in the unmanned aerial vehicle and rotate with the rotary body so that the unmanned aerial vehicle can come close to the facility, and configured to separately extend to a surface of the facility in a perpendicular direction so that a predetermined distance is maintained between the unmanned aerial vehicle and the facility;
    support settling members configured to be separately installed at ends of the supports and attached to the surface of the facility so that the camera takes a close-up picture of the facility; and
    a range finder configured to be installed in the unmanned aerial vehicle and measure a distance between the camera and the facility,
    wherein the camera takes a close-up picture of damage, a defect, or deterioration of the facility when the unmanned aerial vehicle comes close to the facility and is settled by the support settling members.

2. The unmanned aerial vehicle system of claim 1, wherein the rotary body of the unmanned aerial vehicle rotates 0 degrees to 360 degrees together with the camera and the supports according to operation of a body rotator.

3. The unmanned aerial vehicle system of claim 1, wherein the at least two supports are used as unmanned aerial vehicle supports when the unmanned aerial vehicle does not fly, used as landing supports when the unmanned aerial vehicle lands, and extend to the surface of the facility in the perpendicular direction when close-up photography is performed using the camera.

4. The unmanned aerial vehicle system of claim 1, wherein the support settling members are settled on the surface of the facility by vacuum suction or electromagnetic attachment.

5. The unmanned aerial vehicle system of claim 1, wherein the range finder is a laser or ultrasonic transceiver and measures the distance between the surface of the facility, which is a subject, and the camera.

6. The unmanned aerial vehicle system of claim 1, further comprising a lighting provider configured to be installed in the unmanned aerial vehicle and provide lighting to the surface of the facility when the facility is photographed through the camera.

7. The unmanned aerial vehicle system of claim 1, further comprising:
    a monitor configured to be connected to the unmanned aerial vehicle controller and display the picture taken by the camera; and
    a facility damage determiner configured to signal-process data of the picture taken by the camera and analyze and determine whether or not there is damage, deterioration, or a defect on the facility.

8. The unmanned aerial vehicle system of claim 1, wherein the unmanned aerial vehicle comprises:
    a wireless communication module configured to receive a remote control signal from the unmanned aerial vehicle controller and transmit an image signal obtained by the camera to the unmanned aerial vehicle controller;
    a controller configured to control a flight unit according to the remote control signal received through the wireless communication module, control operation of the camera, and control the wireless communication module so that data obtained by the camera is transmitted to the unmanned aerial vehicle controller;
    a memory configured to store the data obtained by the camera;
    the flight unit configured to be operated under control of the controller and cause the unmanned aerial vehicle to fly according to the remote control signal transmitted to the unmanned aerial vehicle controller;
    a battery configured to supply power to the wireless communication module, the controller, the memory, and the flight unit; and
    a body rotator configured to rotate the rotary body so that the supports extend to the surface of the facility in the perpendicular direction.

9. The unmanned aerial vehicle system of claim 8, wherein the body rotator comprises:
    a rotary motor configured to be coupled to a rotation shaft and rotate the rotation shaft so that the rotary body is rotated; and
    a rotation shaft brake configured to be coupled to the rotation shaft and stop rotation of the rotation shaft.

10. The unmanned aerial vehicle system of claim 1, wherein the camera takes a close-up picture of a side surface, a lower surface, or an inclined surface of the facility when a predetermined distance is ensured between the unmanned aerial vehicle and the facility.

11. A photography method using an unmanned aerial vehicle for taking a close-up picture of a facility, the method comprising:
    a) when it is necessary to take a close-up picture of a facility, measuring a distance to the facility using a range finder installed in the unmanned aerial vehicle;
    b) causing the unmanned aerial vehicle to fly and come close to the facility while checking a location of the facility through a monitor connected to an unmanned aerial vehicle controller;
    c) rotating a rotary body by operating a body rotator installed in the unmanned aerial vehicle;
    d) extending at least two supports to a surface of the facility in a perpendicular direction;

e) causing support settling members separately installed at fore-ends of the extended supports to be very close to the surface of the facility;

f) settling the support settling members on the surface of the facility so that a predetermined distance is maintained between the unmanned aerial vehicle and the facility; and g) taking a close-up picture of the surface of the facility with a camera installed in the unmanned aerial vehicle, wherein the rotary body is integrated with the camera and the supports so that operation c) of rotating the rotary body includes rotating the rotary body together with the camera and the supports, and the camera takes a close-up picture of damage, a defect, or deterioration of the facility when the unmanned aerial vehicle comes close to the facility and is settled by the support settling members.

12. The photography method of claim 11, wherein operation c) of rotating the rotary body includes rotating the rotary body 0 degrees to 360 degrees together with the camera and the supports according to operation of the body rotator.

13. The photography method of claim 11, wherein operation a) of measuring the distance to the facility includes first identifying whether or not there is damage, deterioration, or a defect on the facility by photographing the facility at long range through the camera installed in the unmanned aerial vehicle, and determining whether or not it is necessary to take a close-up picture of the surface of the facility.

14. The photography method of claim 11, wherein the range finder is a laser or ultrasonic transceiver, and operation a) of measuring the distance to the facility includes measuring, by the range finder, the distance between the surface of the facility, which is a subject, and the camera.

15. The photography method of claim 11, wherein the at least two supports are used as unmanned aerial vehicle supports when the unmanned aerial vehicle does not fly, used as landing supports when the unmanned aerial vehicle lands, and extend to the surface of the facility in the perpendicular direction when close-up photography is performed using the camera.

16. The photography method of claim 11, wherein operation f) of settling the support settling members on the surface of the facility includes settling the unmanned aerial vehicle on the surface of the facility by vacuum suction or electromagnetic attachment using the support settling members.

17. The photography method of claim 11, wherein operation g) of taking the close-up picture includes providing, by a lighting provider installed in the unmanned aerial vehicle, lighting to the surface of the facility when the facility is photographed through the camera.

18. The photography method of claim 11, wherein operation g) of taking the close-up picture includes taking, by the camera, a close-up picture of a side surface, a lower surface, or an inclined surface of the facility when a predetermined distance is ensured between the unmanned aerial vehicle and the facility.

* * * * *